2,956,919
1-OXO-2-HALO PHOSPHONATES

Joseph W. Baker and George A. Saul, Nitro, W. Va., assignors to Monsanto Chemical Company, St. Louis, Mo., a corporation of Delaware No Drawing. Filed May 23, 1955, Ser. No. 510,553

8 Claims. (Cl. 167—22)

The present invention relates to new and useful compounds containing phosphorus and in particular, 1-oxo-2-haloalkyl phosphonates. More particularly, it relates to diesters of 1-oxo-2-haloalkyl phosphonic acids and to a method for their preparation.

An object of the present invention is to provide as new chemical compounds the diesters of 1-keto-2-haloalkyl phosphonic acids. Another object is to provide new insecticides. A further object is to provide insecticidal compositions containing a small amount of the new diesters. A still further object is to provide a method of combatting insects. A further object is to provide a method of preparation of the new diesters. Additional objects will be apparent from the description following.

In accordance with the present invention the heretofore unknown 1-oxo-2-haloalkyl phosphonates may be prepared by mixing an alpha-halo fatty acid halide and a trialkyl phosphite with resultant splitting out of alkyl halide.

It has been discovered that the 1-oxo-2-haloalkyl phosphonates of this invention are effective insecticides. The presence of halogen is critical for insecticidal activity.

The compounds of the present invention have the general formula $$\text{Hlg}-\underset{\underset{R_1}{|}}{\overset{\overset{R}{|}}{C}}-\overset{\overset{O}{\|}}{C}-\overset{\overset{O}{\|}}{P}\overset{OR_2}{\underset{OR_3}{\diagdown}}$$

where Hlg represents halogen, R is a member of the group consisting of hydrogen and halogen, $R_1$ is a member of the group consisting of hydrogen, halogen and alkyl and $R_2$ and $R_3$ represent a member of the group consisting of hydrocarbon and substituted hydrocarbon, saturated and unsaturated and substituted alkyl.

In the above formula halogen may be fluorine, chlorine, bromine or iodine but chlorine is preferred for reasons of economy. Examples of alkyl groups when $R_1$ is alkyl are methyl, ethyl, propyl, isopropyl, butyl, isobutyl and amyl. Representative of $R_2$ and $R_3$ are methyl, ethyl, propyl, isopropyl, butyl, isobutyl, amyl, isoamyl, hexyl, cyclohexyl, methyl cyclohexyl, methoxyethyl, ethoxyethyl, chloroethyl, chloromethyl, octyl and heptyl radicals.

For the purpose of further describing the invention and not as limitative thereof, the following examples are given:

EXAMPLE 1

Into a 500 ml. flask equipped with a condenser, stirrer, thermometer and dropping funnel was charged 99.7 grams (0.6 mole) of triethyl phosphite. Through the dropping funnel over a period of 70 minutes was added 67.8 grams (0.6 mole of chloroacetyl chloride while the temperature was held at —10° to —20° C. by external cooling. The reaction mixture was heated at 100° C. for one and one-half hours, the last thirty minutes being under reduced pressure. The diethyl chloroacetylphosphonate so obtained was a light yellow liquid. It was soluble in ether, acetone, benzene, chloroform, ethyl alcohol and ethyl acetate but insoluble in water. Analysis gave 14.7% phosphorus as compared to 14.4% calculated for $C_6H_{12}ClO_4P$.

EXAMPLE 2

To 72.7 grams (0.4 mole) of trichloroacetyl chloride was charged 66.5 grams (0.4 mole) of triethyl phosphite. The temperature was held at —30° to —20° C. during the addition which required 20 minutes. The reaction mixture was then heated at 90–100° C. for one and one-half hours, the last 45 minutes being under reduced pressure. The weight loss was essentially theoretical. The diethyl trichloroacetylphosphonate so obtained was a light yellow liquid soluble in ether, acetone, benzene, heptane, chloroform, ethyl alcohol and ethyl acetate but insoluble in water.

EXAMPLE 3

Substituting dichloroacetyl chloride in the process of Example 2, the addition of triethyl phosphite required 45 minutes. The weight loss was essentially theoretical. The diethyl dichloroacetylphosphonate was a light yellow liquid soluble in ether, acetone, benzene, heptane, chloroform, ethyl alcohol and ethyl acetate but insoluble in water. Analysis gave 12.6% phosphorus as compared to 12.4% calculated for $C_6H_{11}Cl_2O_4P$.

EXAMPLE 4

To 54.6 grams (0.3 mole) of trichloroacetyl chloride at —10° to 0° C. was added dropwise 62.5 grams (0.3 mole) of triisopropyl phosphite over a period of 2 hours. The reaction mixture was then heated at 100–110° C. for 2 hours, the last hour being under reduced pressure. The yield of diisopropyl trichloroacetylphosphonate, a light yellow liquid, was approximately quantitative. Analysis gave 10.4% phosphorus and 33.1% chlorine as compared to 9.9% phosphorus and 34.1% chlorine calculated for $C_8H_{14}Cl_3O_4P$.

EXAMPLE 5

Trimethyl phosphite was substituted for the triisopropyl phosphite of Example 4 in a mole to mole reaction with trichloroacetyl chloride. The temperature during the addition of the phosphite was held between —30° to —40° C. by means of a Dry Ice-acetone bath. The yield of dimethyl trichloroacetylphosphonate, a pale yellow liquid, was 89.0%.

EXAMPLE 6

To 90.9 grams (0.5 mole) of trichloroacetyl chloride was charged with stirring 134.8 grams (0.5 mole) of tris-(chloroethyl)-phosphite. The temperature was held at —10° to 0° C. during the addition which required 1 hour. The reaction mixture was then stirred at room temperature for 15 minutes, after which the temperature was raised to 100° C. over a period of 1 hour. Heating at this temperature was continued for another hour, the last half hour being under reduced pressure. The yield of bis(2-chloroethyl)trichloroacetylphosphonate, a colorless liquid, was essentially quantitative. Analysis gave 9.6% phosphorus as compared to 8.8% calculated for $C_6H_8Cl_5O_4P$.

EXAMPLE 7

Substituting chloroacetyl chloride in Example 6, the addition of the tris(chloroethyl)phosphite required 30 minutes. The bis(2-chloroethyl)chloroacetylphosphonate, a colorless liquid, was obtained in essentially theoretical yield.

In the preparation of the new compounds of this invention other alpha-halo fatty acid halides than the chloroacetyl chlorides may be employed, for example the haloacetyl bromides, the halo-acetyl fluorides, the halo-acetyl iodides and alpha-chloropropionyl chloride. Further suitable examples comprise bromoacetyl bromide, bromoacetyl chloride, chloroacetyl fluoride, chloroacetyl iodide, iodoacetyl bromide, iodoacetyl fluoride, fluoroacetyl chloride and the like.

The following is illustrative of the insecticidal properties of the new compounds when evaluated by the residue sprayed Petri dish test. Petri dishes were sprayed with an acetone solution of the test material using approximately 20 ml. for each spraying. The open dishes were held for 24 hours, then milkweed bugs were placed on the dishes and held uncovered for 48 hours at room temperature without food or water. The results are set forth in Table I. It will be noted that the halogen free compound was inactive:

Table I

| Compound | Percent Kill at Concentration of 0.1% |
|---|---|
| Diethyl chloroacetylphosphonate | 100 |
| Diethyl trichloroacetylphosphonate | 100 |
| Diethyl dichloroacetylphosphonate | 100 |
| Diisopropyl trichloroacetylphosphonate | 100 |
| Dimethyl trichloroacetylphosphonate | 100 |
| Diethyl acetylphosphonate | 0 |

The application of the new compounds as foliage sprays was likewise effective. An aqueous spray was applied to potted plants infested with insects, both surfaces of the foliage being sprayed to run-off. After three days the skill of the 2-spotted mite was 100% when employing sprays containings 0.1% of diisopropyl trichloroacetylphosphonate or dimethyl trichloroacetylphosphonate. In this application too diethyl acetylphosphonate was ineffective. These compounds are also nematocides.

As insecticides, the compounds may be applied conveniently in the form of a spray containing the active ingredient in a concentration within the range of 0.1%–10.0% by weight. Although they are insoluble in water, they are soluble in organic solvents. They may be dispersed directly in water or a solution in an organic solvent emulsified in aqueous medium by the aid of a dispersing agent. As dispersing and wetting agents there may be employed soft or hard sodium or potassium soaps, alkylated aromatic sodium sulfonates such as sodium dodecyl benzene sulfonate, or an amine salt of dodecyl benzene sulfonic acid, alkali metal salts of sulfated fatty alcohols, ethylene oxide condensation products of alkyl phenols or tall oil and other dispersing and wetting agents. If application in dust form is preferred, there may be diluted with a carrier such as clay, talc or bentonite.

It is intended to cover all changes and modifications of the examples of the invention herein chosen for purposes of disclosure which do not constitute departure from the spirit and scope of the invention.

What is claimed is:
1. A compound of the formula

$$(RO)_2PO-COCH_2Cl$$

where R represents a member selected from the group consisting of ethyl and chloroethyl.

2. The compounds of the structure

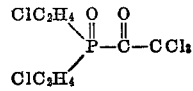

3. The compound of the structure

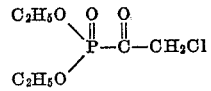

4. An insecticidal composition comprising a carrier and containing, as the active insecticidal component thereof, a compound of the formula

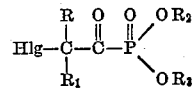

where Hlg represents halogen, R is a member of the group consisting of hydrogen and halogen, $R_1$ is a member of the group consisting of hydrogen, halogen and alkyl groups containing less than 6 carbon atoms and $R_2$ and $R_3$ are radicals containing less than 9 carbon atoms selected from the group consisting of alkyl, cyclohexyl, methyl cyclohexyl, methoxyethyl, ethoxyethyl, chloroethyl and chloromethyl groups.

5. An insecticidal composition comprising a carrier and containing, as the active insecticidal component thereof, a compound of the formula $$(alkyl-O)_2PO-CO-CCl_nH_{3-n}$$

where $n$ is an integer greater than 0 but less than 4 and the alkyl group contains less than 4 carbon atoms.

6. A method of combatting insects which comprises applying to the insects an insecticidal composition containing, as the active component thereof, a compound of the formula

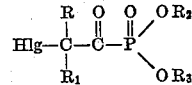

where Hlg represents halogen, R is a member of the group consisting of hydrogen and halogen, $R_1$ is a member of the group consisting of hydrogen, halogen and alkyl groups containing less than 6 carbon atoms and $R_2$ and $R_3$ are radicals containing less than 9 carbon atoms selected from the group consisting of alkyl, cyclohexyl, methyl cyclohexyl, methoxyethyl, ethoxyethyl, chloroethyl and chloromethyl groups.

7. A method of combatting insects which comprises applying to the infested plants an insecticidal composition containing as the active component thereof, a compound of the formula $(alkyl-O)_2PO-CO-CCl_nH_{3-n}$ where $n$ is an integer greater than 0 but less than 4 and the alkyl group contains less than 4 carbon atoms.

8. A method of combatting insects which comprises applying to the infested plants an insecticidal composition containing, as the active component thereof, a compound of the formula $(alkyl-O)_2PO-CO-CCl_3$ where the alkyl radical contains less than 4 carbon atoms.

References Cited in the file of this patent
UNITED STATES PATENTS 2,491,920  Ernsberger _____ Dec. 20, 1949
2,719,167  Schmidt _____ Sept. 27, 1955